April 26, 1949. W. S. HURLEY ET AL 2,468,444
AGITATOR FOR ELECTRIC REFRIGERATORS
Filed April 24, 1947 3 Sheets-Sheet 1
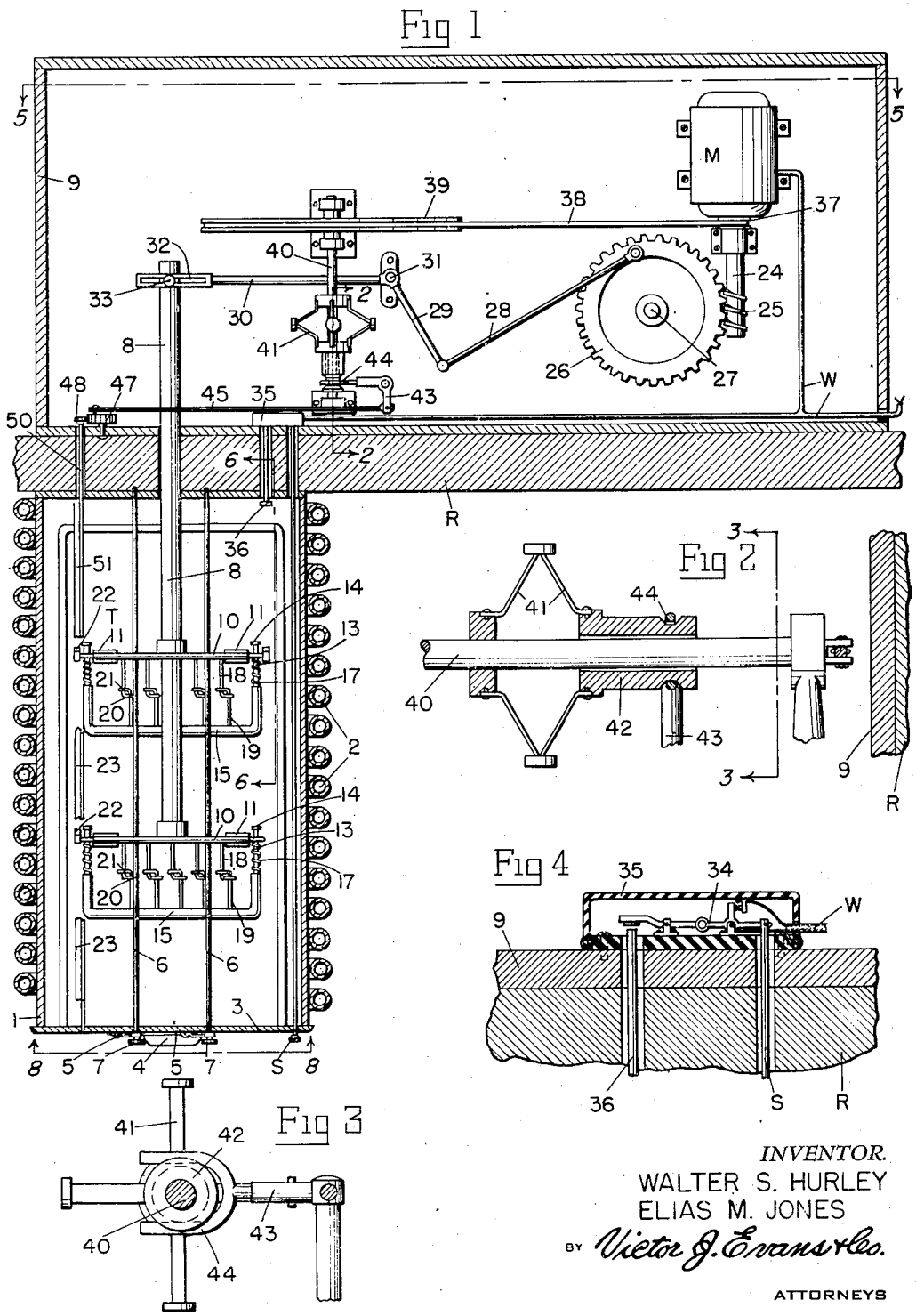
INVENTOR.
WALTER S. HURLEY
ELIAS M. JONES
BY *Victor J. Evans & Co.*
ATTORNEYS April 26, 1949.  W. S. HURLEY ET AL  2,468,444
AGITATOR FOR ELECTRIC REFRIGERATORS
Filed April 24, 1947   3 Sheets-Sheet 2
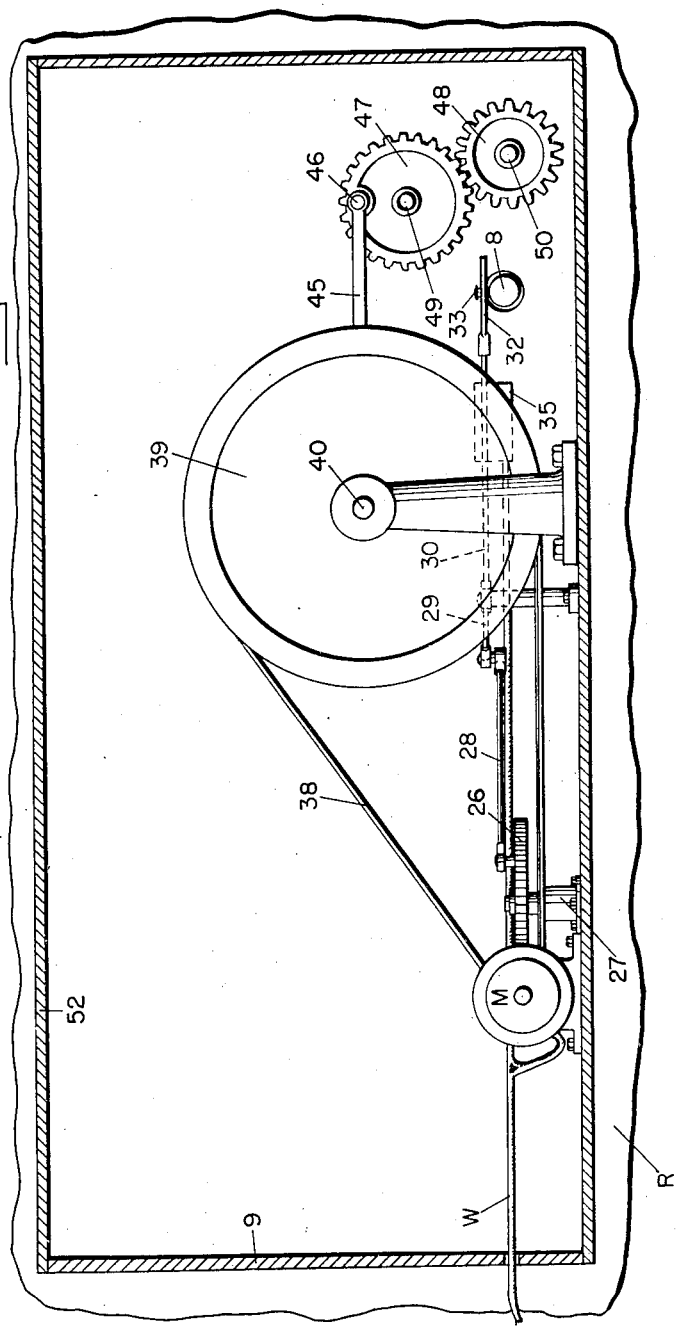
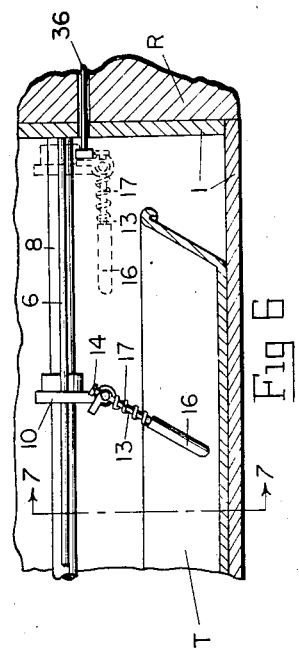
INVENTOR.
WALTER S. HURLEY
ELIAS M. JONES
BY Victor J. Evans & Co.
ATTORNEYS April 26, 1949.  W. S. HURLEY ET AL  2,468,444
AGITATOR FOR ELECTRIC REFRIGERATORS
Filed April 24, 1947  3 Sheets—Sheet 3
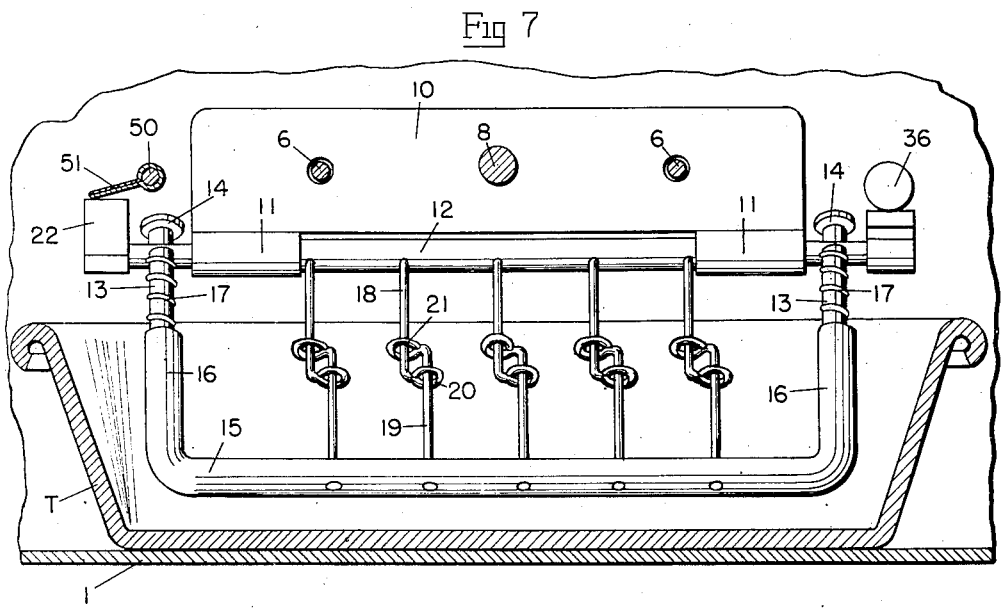
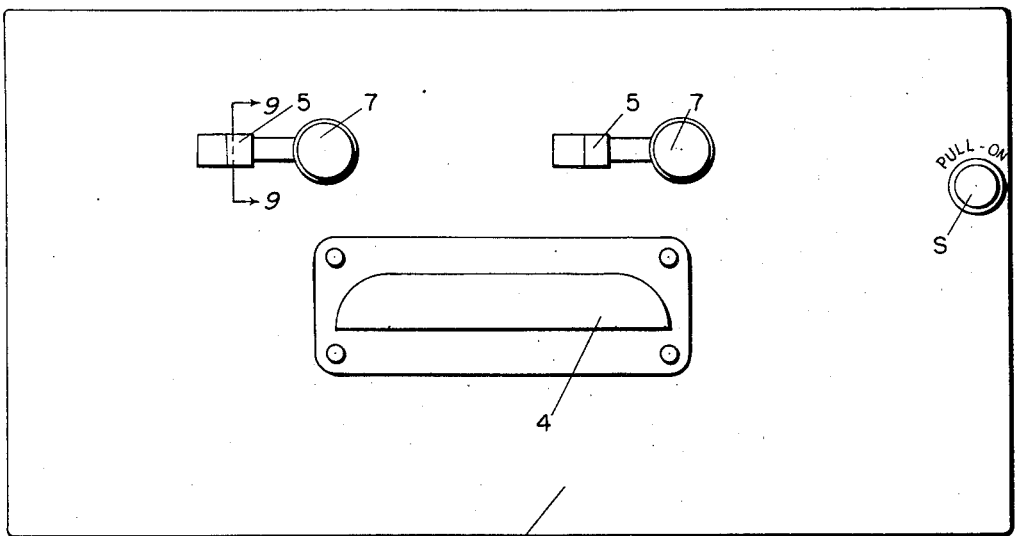
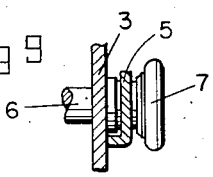
*INVENTOR.*
WALTER S. HURLEY
ELIAS M. JONES
BY *Victor J. Evans & Co.*
ATTORNEYS Patented Apr. 26, 1949

2,468,444

UNITED STATES PATENT OFFICE 2,468,444

AGITATOR FOR ELECTRIC REFRIGERATORS

Walter S. Hurley and Elias M. Jones, San Antonio, Tex.

Application April 24, 1947, Serial No. 743,498

6 Claims. (Cl. 259—113)

1

The present invention relates to the general class of domestic refrigeration appliances, and more specifically to an improved electrically operated agitator for use with a domestic refrigerator, and including a freezing container, as an auxiliary unit or accessory of the domestic refrigerator. While the equipment of the agitating unit is well adapted for freezing various food products, it is especially designed as a component part of an ice cream freezer that is preferably combined for use with the domestic refrigerator structure.

The primary object of the invention is the provision of means for initially agitating the liquid ingredients of the food product in a tray during the early stages of the freezing operation and thus prepare the resulting product for a smooth and uniform texture and consistency; automatic means are provided for stopping the agitation at the proper time; and for removing the agitator mechanism from the mixture to permit the completion of the final stages of the freeizng operations.

Preferably the entire freezing unit including the agitation mechanism, is attachable to, and removable from a conventional refrigerator when not in use to avoid frosting, and to permit cleansing of the operating parts of the unit.

The invention consists in certain novel features of construction and combinations and arrangements of parts as will hereinafter be described, and more specifically set forth in the appended claims.

In the accompanying drawings we have illustrated one complete example of a physical embodiment of our invention in which the parts are combined and arranged according to one mode we have devised for the practical application of the principles of our invention. It will however be understood that changes and alterations are contemplated and may be made in these exemplifying drawings and mechanical structures, within the scope of our claims, without departing from the principles of our invention.

Figure 1 is a sectional view in a horizontal plane showing a portion of a domestic refrigerator with which the freezing apparatus and agitating mechanism of our invention is embodied, and showing the operating and control mechanisms.

Figure 2 is a sectional detail view as at line 2—2 of Fig. 1, of the governor mechanism.

Figure 3 is a transverse sectional view at line 3—3 of Fig. 2 showing a portion of the governor mechanism.

Figure 4 is a detail sectional view of the auto-

2 matically actuated electrical control for the operating electrical motor.

Figure 5 is an enlarged vertical sectional view at line 5—5 of Fig. 1 through the cooling casing for the motor and disclosing the mechanism operated thereby.

Figure 6 is a sectional, vertical, view at line 6—6 of Fig. 1 showing one of the agitators in its relation to the freezing tray.

Figure 7 is an enlarged transverse vertical sectional view through the tray, with an agitator in operative position, as at line 7—7 in Fig. 6.

Figure 8 is an exterior vertical plan view of the container or freezer, as at line 8—8 of Fig. 1; and Figure 9 is a detail sectional view of a quick detachable fastener for the end plate, as at line 9—9 of Fig. 8.

In order that the general arrangement and relation of parts may readily be understood we have designed as R a portion of a vertical wall of the refrigerator, and at a suitable location on the exterior of the refrigerator wall the freezer or container 1 is mounted, and provided with exterior coils 2 for circulation of an appropriate refrigerant for freezing the ingredients of the food product in a conventional tray T.

The removable tray T is inserted in the bottom of the container or freezer casing, and the latter is provided with a quick detachable and removable panel or end plate 3 having a handle 4, and a pair of quick detachable fasteners each including a slotted fastening lug 5, ad rods 6, 6.

The two rods 6 are disposed in horizontal planes and they extend through the freezer casing or container, with their inner ends rigidly secured to the inner end wall of the container, and their outer ends are equipped with heads or handle knobs 7 for co-action with the lugs 5 in retaining the end plate in closed relation to the interior of the freezer casing 1.

The two laterally spaced horizontal rods 6, 6, form a supporting and guiding frame for the pair of horizontally reciprocable agitators or paddles that are rigidly mounted upon a reciprocable operating shaft 8, which is preferably mounted to slide in a bearing bore in the upright wall of the refrigerator, with one end projecting into the interior of a cooling casing 9 attached to the wall R of the refrigerator.

As seen in the plan view of the agitators in Fig. 1 two of them are mounted on the operating shaft or push and pull rod 8 to reciprocate on the guide rods 6, 6, and each flexible agitator is adapted to oscillate on a horizontal axis as it reciprocates within the tray T.

As seen in Fig. 7 each agitator includes an upright transversely extending guide plate 10 that is rigidly mounted upon the reciprocating shaft or plunger 8 and the plate is provided with holes or openings through which the guide rods 6, 6 pass and on which rods the plates slide.

The lower edge of the guide plate is provided with spaced bearings 11 in which a rock shaft 12 is journaled to oscillate, and this rock shaft forms part of the flexible oscillatable, and reciprocable agitators, each of which includes a sectional U-shaped yoke mounted by pins 13, 13 passed through transverse bores in the rock shaft and headed as at 14.

The agitator yoke 15 has tubular angular ends 16 each of which telescopes over a pin 13, and a spring 17 interposed between the rock shaft and the tubular ends of the yoke tend to extend the agitator yoke toward the bottom of the tray. The resilient action of the springs in extending the agitator yoke is limited by means of a number of stirrers connecting the yoke 15 with the rock shaft 12, and each of these stirrers includes a wire 18 rigid with the rock shaft and an offset parallel wire 19 rigid with the yoke 15. Wire 18 is equipped with an end loop or eye 20 surrounding and slidable on wire 19, and the latter wire has a loop 21 slidable on wire 18. In addition to the agitation of the oscillating yokes 15, these stirrers also stir the ingredients and assist in mixing the ingredients.

The plunger 8 imparts the reciprocating movement to the agitators, and for oscillating the reciproacting agitators, each device is provided with a cam 22 mounted on end of the rock shaft 12, and this cam travels in frictional contact with a section of a cam track 23 that is supported in the path of movement of the cam and in position to partially rotate, or rock the shaft, as the cam contacts therewith.

Power for reciprocating the operating shaft 8, or plunger, is derived from an electric motor M mounted in the cooling casing 9 and provided with supply wires W for an operating current or circuit, and a main switch S is indicated for controlling the electrical supply.

The shaft 24 of the motor is provided with a worm 25 that meshes with a gear wheel 26 journaled at 27 in the motor casing, and a pitman or link 28 pivotally connects the gear wheel with the short arm 29 of a bell crank lever 30 that is pivoted at 31 in the casing. The free end of arm 30 is provided with a slotted fork 32 that is pivotally and slidably connected with the plunger 8 by a transverse pin 33, and it will be apparent that power and motion are transmitted from the motor through these parts to the plunger for reciprocating it.

As the mixture becomes thicker and more dense, starting on the bottom of the tray, the flexibly supported agitators are, due to the density of the freezing ice cream, caused to reciprocate on a gradually higher level, to mix the upper portion of the ingredients, and when the agitators reach a predetermined elevation, the electrical connection for operating the motor is automatically cut off, and finally the agitators are withdrawn from operative position and from contact with the freezing mixture.

For cutting out the motor M automatically, and for turning on and turning off the motor manually through the main switch push-button S, a combined switch is indicated at 34 enclosed within the switch box 35 in Fig. 4; and a switch rod 36 for automatic control of the switch is slidably mounted, as seen in Fig. 6 in the path of one of the agitators when the latter is in its elevated position above the freezing mixture. Then by contact of the agitator with the actuating rod or, pin 36 (dotted lines Fig. 6) the motor switch is cut out.

While the motor is operating and the bell crank lever is causing the reciprocal movement of the agitator shaft and the agitators, a governor mechanism is also being operated from the motor shaft, and when transmission of power to the governor mechanism ceases with cutting out of the motor, a spring actuated mechanism is released for causing elevation of the agitators entirely out of contact with the freezing mixture.

For this purpose a governor driving mechanism is provided including a small pulley 37 on the motor shaft, a belt 38, and a larger pulley 39 on the governor shaft 40. A suitable governor as 41 of the centrifugal type is slidably mounted by its hub 42 on the shaft 40, and a bell crank lever 43 is provided with a strap or band 44 encircling an annular exterior groove on the hub is pivotally connected with a link 45 that is pivotally and eccentrically connected at 46 with a gear 47 in mesh with a second gear 48 mounted on their respective shafts journaled in suitable bearings in the motor casing. As long as the motor is operating and the centrifugal governor is extended, the gear 47 is held inactive. When the motor M stops the extended governor automatically contracts to activate the bell crank lever 43, and through link or connecting rod 45 the gears 47, 48, one of which may be a spring-gear, are turned; and the shaft 50 of gear 48 is provided with a pressure cam or lug 51 which contacts the complementary lug 22 of the agitators. Thus, as the shaft 50 is rocked, the co-acting cams swing the agitators upwardly and away from the freezing mixture in order that the final freezing stages of the ice cream may be completed without agitation.

When the contents of the tray have attained the desired texture, the end plate 3 may be removed, giving access to the interior of the freezer or container for removal of the tray.

The ice-cream making unit may also be removed, if desired for cleansing of its parts; and a door or removable plate 52 of the motor casing 9 may also be removed for access to the interior of the casing for servicing the motor-operated parts of the unit.

Having thus fully described our invention, what we claim as new and desire to secure by Letters Patent is:

1. The combination in electrically operated agitating mechanism for cream in a tray contained in a freezer which includes a flexible oscillatable agitator, means for reciprocating the agitator, and means for oscillating the agitator, an electric motor and power transmission mechanism therefrom to the agitator, a governor mechanism operated by the motor, lifting means for the agitator controlled by said governor, an electric control for the motor, means carried by said electric control which is adapted to operate the electric control for stopping the motor when the oscillatable agitator engages said means at a predetermined height, and means actuated by the governor when the motor is stopped for elevating the agitator from the tray.

2. The combination in an electrically operated mechanism for agitating cream in a tray located in a freezer, which includes a reciprocable operating shaft and a flexible oscillating agitator mounted thereon, means for oscillating the agitator, an electric motor, a worm and worm gear actuated by the motor, a bell-crank lever operatively to the operating shaft, a link operatively connecting the worm gear and bell crank lever, an electric control for the motor, and a depending rod connected to said electric control adapted to operate the electric control for stopping the motor when the oscillating agitator reaches a maximum height and engages said rod.

3. The combination in mechanism for agitating cream in a tray located in a freezer, with a reciprocable operating shaft, and supporting guide rods mounted in the freezer, of a flexible oscillatable agitator having a blade rigid with the shaft and slidable on the guide rods, a U-shaped yoke having a rock shaft journaled in the plate, motor-operated means for reciprocating the shaft, and cam means on the ends of the rock shaft adapted to coact with a cam track mounted in the freezer for automatically oscillating the agitator.

4. In an ice cream agitating mechanism, the combination with a reciprocating shaft, and operating means therefor, of a blade movable with the shaft and guides therefor, a rock-shaft journaled in the blade and means for rocking said shaft, a pair of spaced pins resiliently supported in the rock shaft, a U-shaped agitator having tubular ends telescoping said pins, and flexible connections between said agitator and rock shaft forming stirrers.

5. In an ice cream agitating mechanism, the combination with a reciprocating shaft and operating means therefor of a blade movable with the shaft and guides therefor, a rock-shaft journaled in the blade and means for rocking the shaft, a pair of spaced pins supported in the rock shaft, a U-shaped agitator having tubular ends telescoping said pins and springs mounted between said ends and the rock shaft, a series of pairs of parallel off-set wires attached to the rock-shaft and agitator, and each of said wires having a loop at its free end encircling an adjoining off-set wire.

6. In an ice cream agitating mechanism the combination with a reciprocating shaft and operating means therefor, of a blade movable with the shaft and guides therefor, a rock shaft journaled in the blade and means for rocking said shaft including a cam lug thereon and a cam track for co-action with the lug, a pair of spaced pins resiliently supported in the rock shaft, a U-shaped agitator having tubular ends telescoping said pins, and flexible connections forming stirrers between said rock shaft and agitator.

WALTER S. HURLEY.
ELIAS M. JONES.

REFERENCES CITED

The following references are of record in the file of this patent:

UNITED STATES PATENTS

| Number | Name | Date |
| --- | --- | --- |
| 1,095,591 | Omer et al. | May 5, 1914 |
| 1,427,877 | Weeks | Sept. 5, 1922 |
| 1,447,849 | Hough | Mar. 6, 1923 |
| 1,956,322 | Grant | Apr. 24, 1934 |